United States Patent
Files et al.

(10) Patent No.: US 10,133,423 B2
(45) Date of Patent: Nov. 20, 2018

(54) INFORMATION HANDLING SYSTEM LOW LATENCY TOUCH REJECTION BUFFER

(71) Applicant: Dell Products L.P., Round Rock, TX (US)

(72) Inventors: Jace Files, Round Rock, TX (US); Preeth K. Srinivasan, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 47 days.

(21) Appl. No.: 14/690,702

(22) Filed: Apr. 20, 2015

(65) Prior Publication Data
US 2016/0306483 A1    Oct. 20, 2016

(51) Int. Cl.
G06F 3/041     (2006.01)
G06F 3/0354    (2013.01)
G06F 3/044     (2006.01)
G06F 3/0488    (2013.01)

(52) U.S. Cl.
CPC .......... *G06F 3/044* (2013.01); *G06F 3/03545* (2013.01); *G06F 3/0418* (2013.01); *G06F 3/0488* (2013.01); *G06F 2203/04104* (2013.01); *G06F 2203/04108* (2013.01)

(58) Field of Classification Search
USPC .......................... 345/173–175, 156; 349/12
See application file for complete search history.

(56) References Cited

U.S. PATENT DOCUMENTS

| | | | |
|---|---|---|---|
| 2013/0169570 A1* | 7/2013 | Kamii | G06F 3/0488 345/173 |
| 2013/0201117 A1* | 8/2013 | Yeung | G06F 3/0418 345/173 |
| 2013/0328810 A1* | 12/2013 | Li | G06F 3/043 345/173 |
| 2015/0049031 A1* | 2/2015 | Maruoka | G06F 3/03545 345/173 |

* cited by examiner

*Primary Examiner* — Jennifer Mehmood
*Assistant Examiner* — Deeprose Subedi
(74) *Attorney, Agent, or Firm* — Zagorin Cave LLP; Robert Holland

(57) ABSTRACT

A portable information handling system having a touchscreen display selectively rejects touch inputs by removing images from the display associated with the rejected touch inputs after presentation of the images. A touch buffer temporarily stores detected touches, such as by removing touches as the age in the buffer exceeds a threshold. If a trigger event is detected, such as detection of a palm touch or writing stylus, then all or selected of the touch inputs remaining in the buffer are removed as images presented at the display.

20 Claims, 3 Drawing Sheets

INFORMATION HANDLING SYSTEM LOW LATENCY TOUCH REJECTION BUFFER

BACKGROUND OF THE INVENTION

Field of the Invention

The present invention relates in general to the field of information handling system touch input management, and more particularly to an information handling system low latency touch rejection buffer.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems often accept end user inputs as touches made to a touchscreen liquid crystal display (LCD). For example, tablet information handling systems are built into a planar housing that does not include a physical keyboard. In order to interact with such a tablet information handling system, the user typically activates a keyboard for presentation at the LCD and types inputs at the presented keyboard that are detected by a capacitive touch surface of the LCD. Eliminating a physical keyboard reduces the housing size, thus providing convenience and portability for the end user.

Including a touchscreen in a tablet information handling system also provides the end user with other types of touch inputs that tend to be more intuitive than keyboard inputs. For example, the end user touches the screen to make a mouse input, thus allowing the end user to make convenient cursor movements and drop, drag and copy operations. In some instances, end users may handwrite inputs on a touchscreen instead of using a keyboard. Logic running on the portable information handling system analyzes touch movements to determine letters traced by the end user's finger. More precise writing inputs may be performed with a stylus that includes a capacitive device sensed by the capacitive touch surface. In addition to supporting handwritten letters, tablet information handling systems may also support drawings done on the capacitive touch surface both by a finger or a stylus.

One difficulty with using touchscreens to accept finger and/or stylus inputs is that end users will often touch the display without an intention to make an input. Generally, keyboard controllers on information handling systems that include touchscreens apply one or more input detection algorithms to distinguish between intended and unintended touches. An example of such an input detection algorithm is a "large object" detection algorithm designed to reject touch events that encompass an area of greater than a defined size, such as 25 mm. Such input detection algorithms tend to have low latency requirements so that end users do not experience excessive delays between the timing of an input and the presentation of the input at the display. The low latency often means that initial small areas of touch that precede a larger touch area may be detected as an intended touch and presented as such to the end user. For example, an unintended dot or line is written before the large object detection algorithm engages to reject further touch events. Typically, when writing with a finger a user will not rest his palm on a touchscreen; however, when writing with a stylus a user often will rest his palm on the touchscreen to produce an unintended dot or line.

SUMMARY OF THE INVENTION

Therefore, a need has arisen for a system and method which provides an information handling system low latency touch rejection buffer.

In accordance with the present invention, a system and method are provided which substantially reduce the disadvantages and problems associated with previous methods and systems for rejecting touches made at a touchscreen that are not intended as touch inputs. Touch events presented at a display are selectively removed after presentation by removing unexpired touch events stored in a touch buffer that are associated with a detected touch event trigger, such as a large object detection or a writing pen stylus detection.

More specifically, a portable information handling system has a touchscreen display disposed in a planar housing having a tablet configuration. Touch inputs made at the touchscreen are detected and presented on the display, such as by the operating system or by a drawing and/or word processing application. As touch inputs are detected at the touchscreen, the inputs are stored in a buffer for a predetermined age, such as with a timer that expires and removes touch inputs after storage for a second. If a touch event trigger is detected, then all or selected of the unexpired touch events stored in the buffer are collected and applied to remove images presented on the touchscreen and associated with the touch events. For example, if a large object detection event occurs, images associated with touch events stored in the buffer are removed from the display within a predetermined area of the large touch event, such as 25 mm. As another example, if a pen stylus touch or hover event is detected, all images associated with touch events in the touch buffer are removed from presentation at the display. The sensitivity of the removal is adjustable based upon the time that touch events are stored in the buffer before expiration and removal of the touch events from the touch buffer.

The present invention provides a number of important technical advantages. One example of an important technical advantage is that inadvertent large object touches at an information handling system touchscreen are rejected as inputs with low latency and reduced processing overhead. As opposed to conventional temporal processing of real time events to filter touches, post processing of buffered touch events to "undo" unintended touch inputs provides accurate and timely cleanup of unintended inputs after presentation with minimal impact on the user experience. Historic touch events temporarily monitored in a buffer based upon specific triggers, such as palm or stylus detection, provide accurate removal of inputs for targeted trigger events by comparing buffered inputs with subsequent inputs over the buffer lifespan. Buffering inputs on a temporary basis and then deleting the buffer at a predetermined age prevents storage of undue amounts of input data and provides a rapid response. Targeting specific events, such as palm or stylus detection, limits analysis to those events likely to result in unintended output presentation and likely to be missed by real time processing, such as conventional large object detection algorithms. The resulting low latency removal of smaller sized preliminary touches missed by large object algorithms generally occurs before an end user notices the inadvertent touch event presentation or looks to the end user like an automated correction that takes place before the user must do a manual correction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Post presentation processing of buffered touch inputs over a defined aging period at a portable information handling system removes unintended inputs associated with defined touch trigger events. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
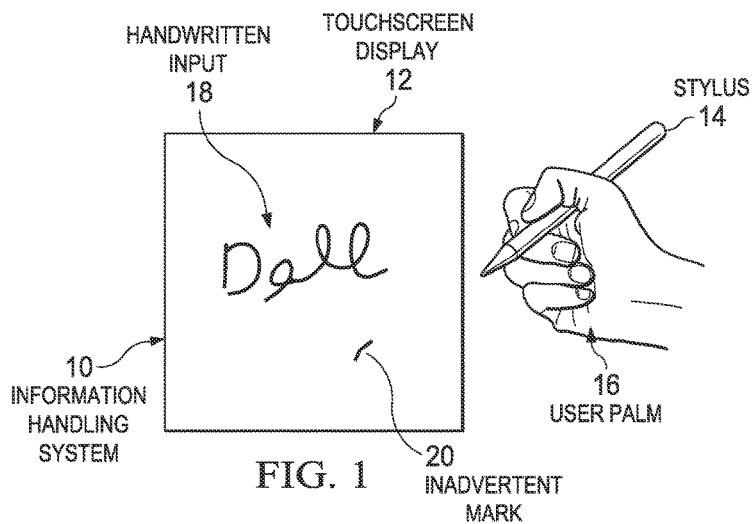
FIG. 1 depicts an upper view of a tablet portable information handling system having a low latency touch rejection buffer.

Referring now to FIG. 1, an upper view depicts a tablet portable information handling system 10 having a low latency touch rejection buffer. Tablet portable information handling system 10 is built in a planar housing that exposes a touchscreen display 12 at an upper surface to present information as visual images and accept inputs as touches. In the example embodiment, an end user holds a writing stylus 14 in her hand so that the user palm 16 presses against touchscreen display 12 when the user writes on touchscreen display 12 with stylus 14. As an example, the user is shown with her hand raised after using stylus 14 to write "Dell" on touchscreen display 12. An inadvertent mark 20 is also presented at touchscreen display 12 as an unintended input made by the end user while writing with stylus 14. Although FIG. 1 depicts a tablet footprint for holding touchscreen display 12 that accepts an input from a stylus, in alternative embodiments other types of housings may hold a touchscreen display 12 to accept touch inputs with fingers or other types of touch tools. In other alternative embodiments, touches are detected at a touch device separate from the display, such as a touch pad.

Portable information handling system 10 includes conventional palm rejection, such as a "large object" algorithm, that rejects touch events over large areas, such as when a user rests a palm or hand on touchscreen display 12. Users generally expect such algorithms to have a low latency so that the presentation of touches as inputs are not excessively delayed by processing for large object events. As a result, the initial small area touch that precedes a large object event sometimes creates an inadvertent mark 20 before the large object algorithm kicks in to reject touches associated with the large object. To prevent such inadvertent marks 20, portable information handling system 10 keeps a running touch input buffer that logs all touch events and keeps the touch events stored for a relatively short time period, such as one to three seconds, before deleting the buffered touch inputs. If a large object touch event or other touch event trigger is detected by conventional touch rejection algorithms, then all or some defined subset of touch inputs stored in the buffer are used to remove display touches at touchscreen display 12 that precede the touch event trigger. Said another way, the temporally-limited buffer is used to "undo" touches presented at touchscreen display 12 when a touch event is detected that is associated with inadvertent marks 20, such as a palm touch or a writing stylus touch/hover event. For example, the touch input buffer includes X,Y positions for touches and "undoes" presentation of inadvertent inputs for unexpired buffer values within a predetermined distance of a large object touch event. As another example, detection of a capacitive touch device in a stylus hovering over or touching touchscreen display 12 "undoes" all stored buffer values that precede the stylus hover and/or touch event.

Figure 2:
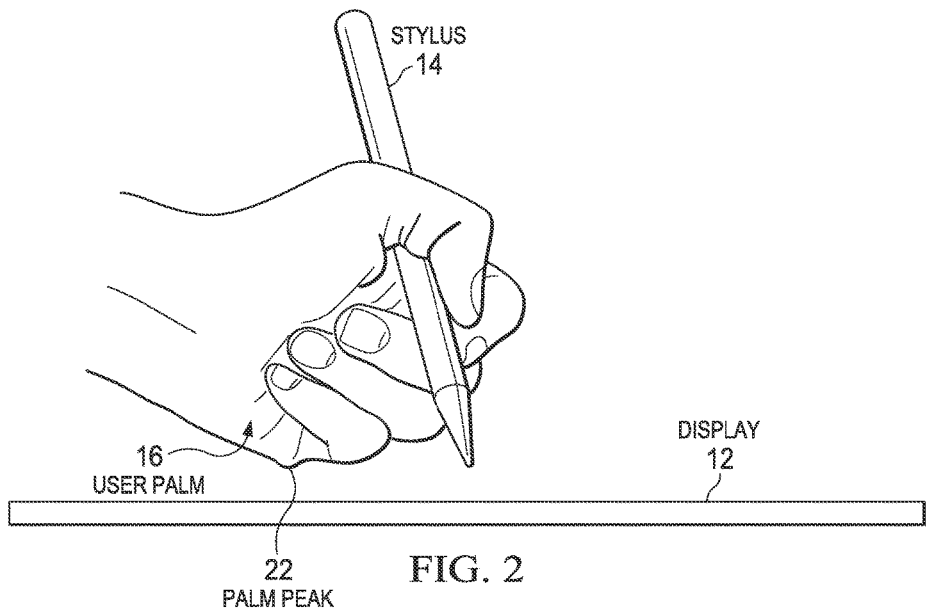
FIG. 2 depicts a side view of one example of unintended detection of a palm touch as an input.

Referring now to FIG. 2, a side view depicts one example of unintended detection of a palm 16 touch as an input. In the example depiction the user's palm 16 forms a palm peak 22 when holding stylus 14 with a normal pen grip. As palm peak 22 hits display 12, a capacitive surface sensor detects the relatively small area of palm peak 22 as a finger touch and makes an inadvertent mark 20. As palm 16 comes to rest on display 12, a large object detection algorithm kicks into action and starts to reject touches by palm 16 as a large object so that the palm 16 touches are not presented as touch inputs. Portable information handling system 10 uses the large object detection and/or the stylus 14 detection to remove inadvertent mark 20 after inadvertent mark 20 is displayed but before the touch data of inadvertent mark 20 expires from the touch input buffer, such as within one second. The touch data for inadvertent mark 20 may be removed based on its location relative to the large object touch event location or based solely on its temporal relationship to the stylus hover/touch event time. By simply removing display inputs based on the presence of data in the buffer, a low latency response is provided to "undo" inadvertent touches of an end user so that the end user is unlikely to notice the removal and, if noticed, view the removal as a type of auto correction of text by a word processor.

Figure 3:
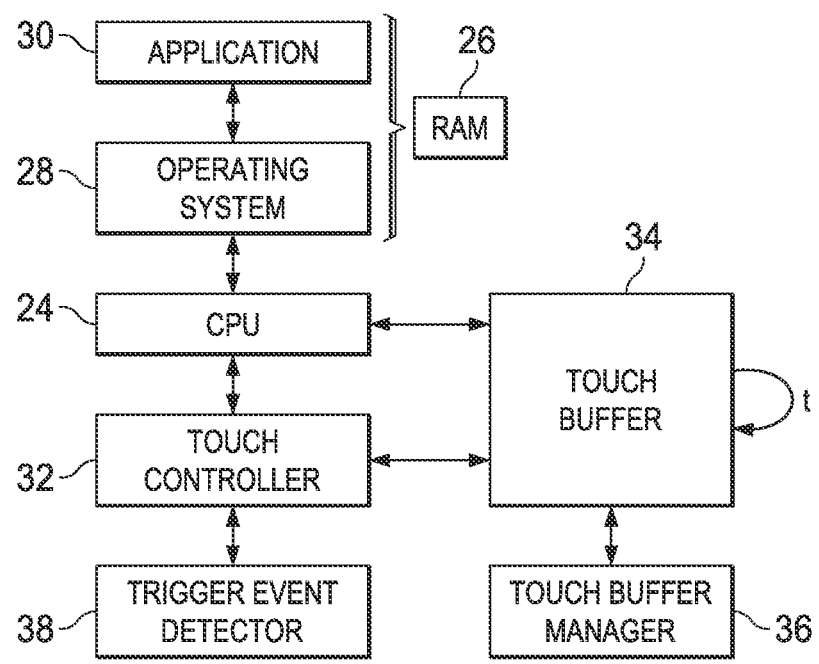
FIG. 3 depicts a block diagram of a system for a low latency touch rejection buffer at a portable information handling system.

Referring now to FIG. 3, a block diagram depicts a system for a low latency touch rejection buffer at a portable information handling system 10. Information handling system 10 processes information with a central processing unit (CPU) 24 interfaced with a memory 26, such as a random access memory (RAM). For instance, an operating system 28, such as WINDOWS or ANDROID, runs over CPU 24 and supports execution of applications 30, such as word processing or drawing applications that accept touch inputs. A touch controller 32 interfaces with touchscreen display 12 to detect touch locations and provide the touch locations to operating system 28 and/or application 30 for presentation at touchscreen display 12. For example, touch controller 32 is an embedded controller or keyboard controller that manages human interface device interactions as part of a chipset. Touch controller 32 may include large object detection and stylus touch and/or hover detection, or these algorithms may be supported in or distributed across a variety of hardware, firmware and software devices.

Touch controller 32 interfaces with touch buffer 34 and stores all touch events in touch buffer 34 as the touch events are detected. A touch buffer manager 36 monitors touch buffer 34 to delete entries made by touch controller 32 as the entries reach a threshold age, such as one second from a time stamp that represents the touch event detection time or the time at which the entry was made in touch buffer 34. For example, touch buffer manager 36 is a state machine that periodically deletes entries from touch buffer 34 based on a time stamp comparison with a current time. A trigger event detector 38 interfaces with touch controller 32 to indicate that a trigger event has occurred for applying data in touch buffer 34 to "undo" marks on display 12. For example, trigger event detector 38 indicates a trigger event if a large object detection algorithm detects a large object touch rejection of touch inputs at the display. As another example, trigger event detector 38 indicates a trigger event in a capacitive stylus is detected, such as if a capacitive device in a stylus is detected and identified based upon its capacitive characteristics. Touch controller 32 responds to the detection of the trigger event by removing touches as inputs presented at the display based upon touch inputs that remain in touch buffer 34, i.e., that have not expired or aged for deletion by touch buffer manager 34. In one embodiment, touch controller 32, touch buffer 34, touch buffer manager 36 and trigger event detector 38 are firmware modules supported on an embedded controller. In an alternative embodiment, they are hardware, firmware and software devices that interact under the management of operating system 28 or application 30. In another embodiment, the sensitivity of corrections performed on display 12 is managed by adjusting the time that touch buffer 34 stores the touch data.

Figure 4:
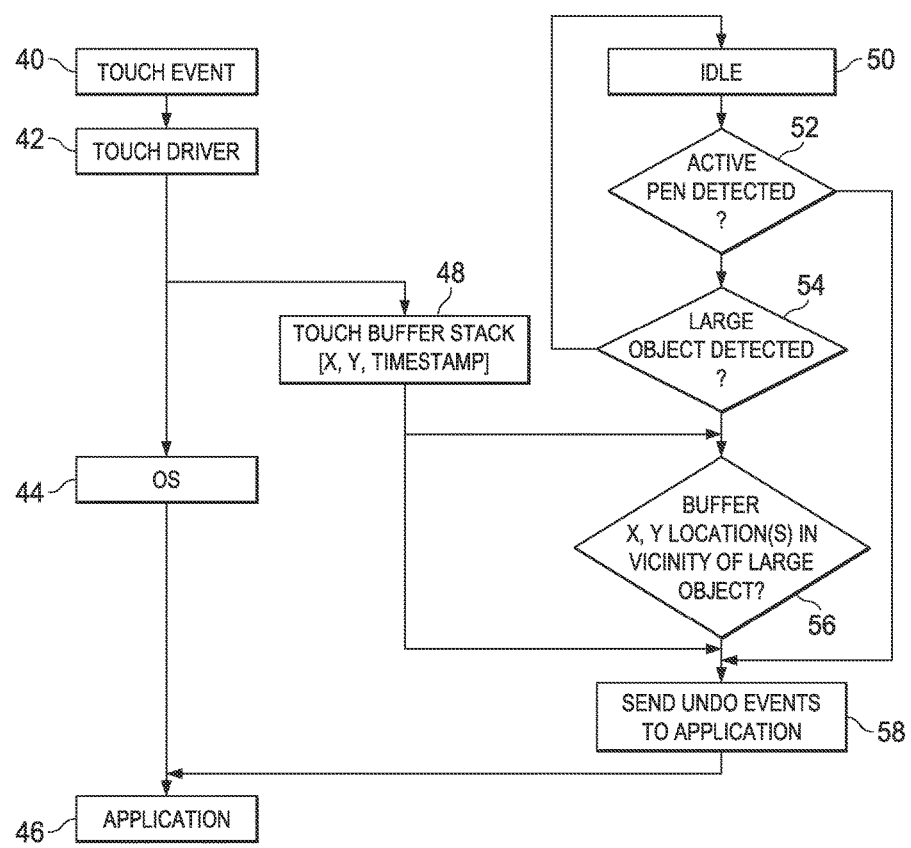
FIG. 4 depicts a flow diagram of a process for a low latency touch rejection buffer at a portable information handling system.

Referring now to FIG. 4, a flow diagram depicts a process for a low latency touch rejection buffer at a portable information handling system. The process starts at step 40 with a touch event detected at a touchscreen display or other type of touch sensor. At step 42, the touch event is provided to a touch driver, such as an option ROM in a touch controller, keyboard controller, embedded controller or other human interface device. At step 44, the touch driver provides the touch event to the operating system and, at step 46, to the application presented by the display so that the touch event may be presented in a conventional manner. At step 42, the touch driver mirrors or otherwise forwards the touch event to the touch buffer at step 48 for storage with the position of the touch event and the time of the touch event.

In parallel with the touch detection and presentation of images, a trigger event detection process periodically comes out of an idle state to determine if a trigger event has occurred. At step 52, a determination is made of whether an active pen stylus is detected, such as with a touch or a hover event. If not, the process continues to step 54 to determine if a large object event has occurred. If at step 54 a large object detection event has not occurred, the process returns to step 50 to periodically check for trigger events. If at step 54 a large object detection has occurred, the process continues to step 56 to retrieve touch events stored in touch buffer at step 48 within a defined area, such as 25 mm of the large touch event. If so, the identified touch events are marked to be "undone" from presentation by the display. At step 52, if an active pen is detected, the process continues to step 58 with an indication that all touch events in the touch should be undone. At step 58, an "undo" instruction is sent to the application and/or operating system to remove the images associated with the touch events identified by either step 52 or step 58. In various embodiments, the location of touch events that are removed from the display may be set to include varying sets of touch events based on the desired corrections for the type of touch event, such as the types of inadvertent touches that occur with the trigger event.

Although the present invention has been described in detail, it should be understood that various changes, substitutions and alterations can be made hereto without departing from the spirit and scope of the invention as defined by the appended claims.

What is claimed is:

1. A portable information handling system comprising:
    a planar housing;
    a processor disposed in the planar housing and operable to execute instructions to process information;
    a memory disposed in the planar housing and interfaced with the processor, the memory operable to store the information;
    a display disposed in the planar housing and interfaced with the processor and memory, the display operable to present the information as visual images and to accept inputs as touches made at a surface of the display;
    a touch controller interfaced with the display and operable to detect the touches;
    a touch buffer interfaced with the touch controller and operable to buffer detected touches for a predetermined time of a fixed duration from the time of each detected touch, the detected touches deleted from the touch buffer when the predetermined time passes; and
    an event detector stored in non-transitory memory as firmware to execute on a processor, the event director interfaced with the touch controller, the event detector operable to detect a predetermined event and, in response to detecting the predetermined event, to selectively delete touch output presented on the display and included in the touch buffer that has a predetermined relationship with the detected predetermined event.

2. The portable information handling system of claim 1 further comprising a touch buffer manager interfaced with the touch buffer and operable to delete all touch buffer inputs that have a predetermined age.

3. The portable information handling system of claim 2 wherein the predetermined age comprises an age of greater than one second.

4. The portable information handling system of claim 2 wherein the touch buffer manager accepts end user parameters to adapt the predetermined age for a desired display sensitivity.

5. The portable information handling system of claim 1 wherein the predetermined event comprises detection of a large object event, the event detector deleting all output presented at the display and included in the touch buffer that falls within a predetermined distance of the detected large object event.

6. The portable information handling system of claim 1 wherein the predetermined event comprises detection of a writing stylus in contact with the display, the event detector deleting all output presented at the display and included in the touch buffer that precedes the stylus touch.

7. The portable information handling system of claim 6 wherein detection of a writing stylus is performed by detection of a capacitive characteristic of the writing stylus.

8. The portable information handling system of claim 1 wherein the predetermined event comprises detection of a writing stylus hovering proximate to but not touching the display.

9. A method for selectively rejecting touch inputs at a portable information handling system display, the method comprising:
  detecting touches at the display;
  presenting the touches as images at the display;
  storing detected touches in a buffer;
  deleting stored detected touches from the buffer at a predetermined age of fixed duration, the predetermined age determined from the time of the detected touch;
  detecting a predetermined touch event; and
  in response to the predetermined touch event, removing images presented at the display for predetermined of the touches stored in the buffer.

10. The method of claim 9 wherein deleting stored detected touches from the buffer further comprises:
  periodically comparing a time stamp of each stored detected touch with a clock; and
  in response to comparing, deleting any detected touches from the buffer having greater than a predetermined time between the time stamp and the clock.

11. The method of claim 10 further comprising:
receiving end user touch sensitivity selections; and
applying the end user touch sensitivity selections to adjust the predetermined time.

12. The method of claim 10 wherein the predetermined time is one second.

13. The method of claim 9 wherein the predetermined touch event comprises a large object detection and removing images comprises removing images presented at the display of touches stored in the buffer and having a predetermined proximity of the large object detection.

14. The method of claim 9 wherein the predetermined touch event comprises a large object detection and removing images comprises removing all images presented at the display of touches stored in the buffer.

15. The method of claim 9 wherein the predetermined touch event comprises detection of a writing stylus hovering proximate to but not in contact with the display and removing images comprises removing images presented at the display of touches in the buffer.

16. The method of claim 9 wherein the predetermined touch event comprises detection of a writing stylus in contact with the display.

17. A system for selectively rejecting touch inputs at a portable information handling system display, the system comprising:
  a touch controller operable to detect touches at the display and provide the touches to the display for presentation as images;
  a touch buffer interfaced with the touch controller and operable to store all detected touches;
  a touch buffer manager interfaced with the touch buffer and operable to delete all detected touches from the touch buffer at a predetermined age from the time at which each touch is stored in the buffer; and
  an event detector stored in non-transitory memory to execute as firmware on a processor and interfaced with the touch controller and the touch buffer, the event detector operable to detect a predetermined touch event and, in response to the predetermined touch event, to remove images from the display generated by touches for predetermined of the detected touches stored in the buffer.

18. The system of claim 17 wherein the predetermined touch event comprises detection of a writing stylus hovering proximate to but not in contact with the display and removing images comprises removing images presented at the display of touches in the buffer.

19. The system of claim 17 wherein the predetermined touch event comprises a large object detection and removing images comprises removing all images presented at the display of touches stored in the buffer.

20. The system power system of claim 17 wherein the predetermined touch event comprises a large object detection and removing images comprises removing images presented at the display of touches stored in the buffer and having a predetermined proximity of the large object detection.

* * * * *

UNITED STATES PATENT AND TRADEMARK OFFICE
CERTIFICATE OF CORRECTION

PATENT NO. : 10,133,423 B2
APPLICATION NO. : 14/690702
DATED : November 20, 2018
INVENTOR(S) : Jace Files and Preeth K. Srinivasan Page 1 of 1

It is certified that error appears in the above-identified patent and that said Letters Patent is hereby corrected as shown below:

In Column 8, Line 44, please delete "power system".

Signed and Sealed this
Twenty-fifth Day of December, 2018

Andrei Iancu
*Director of the United States Patent and Trademark Office*